March 8, 1960   E. H. ARNOLD, JR   2,928,072
SIGNAL LIGHTS
Filed Aug. 18, 1958   3 Sheets-Sheet 1
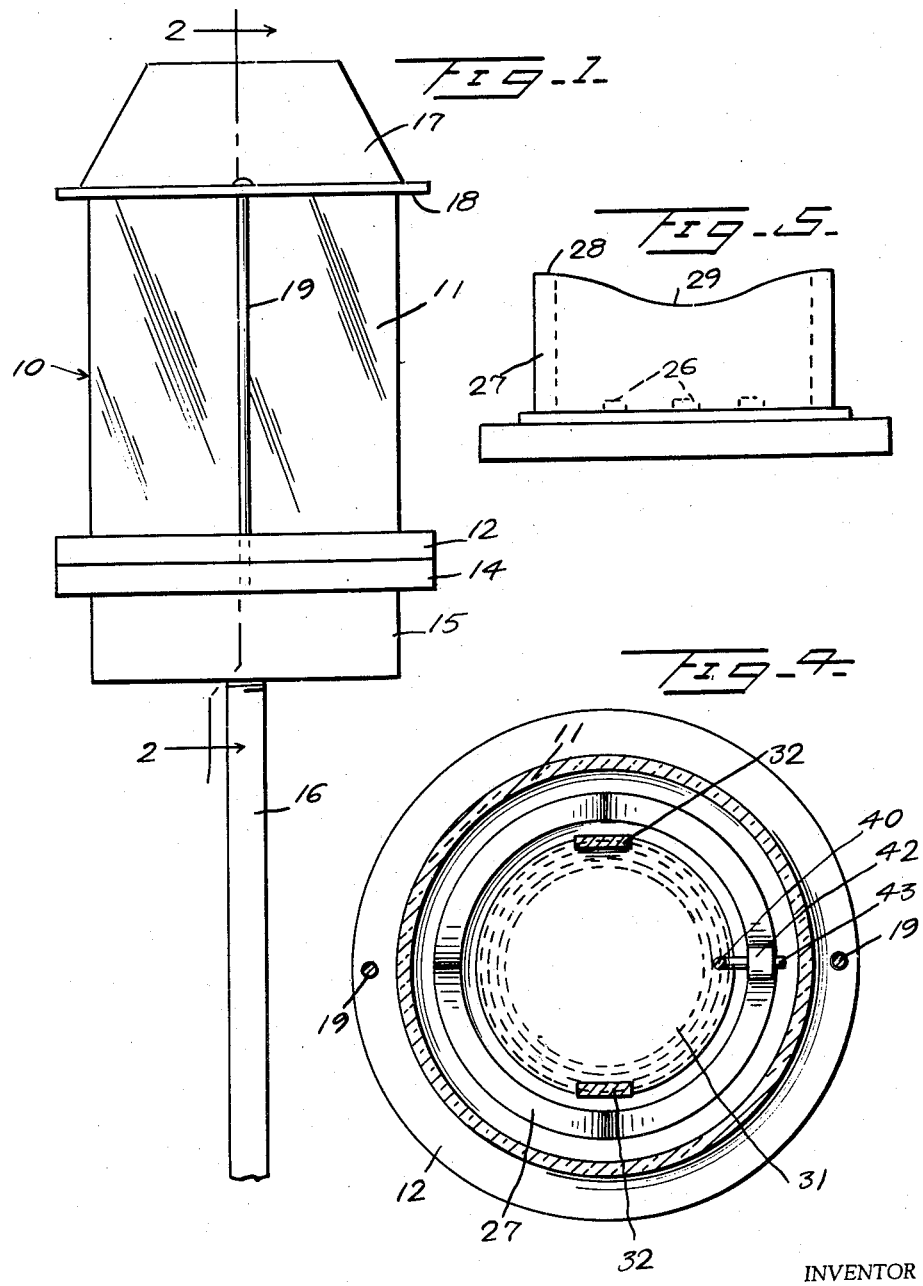
INVENTOR
Edward H. Arnold, Jr.
BY
ATTORNEYS.

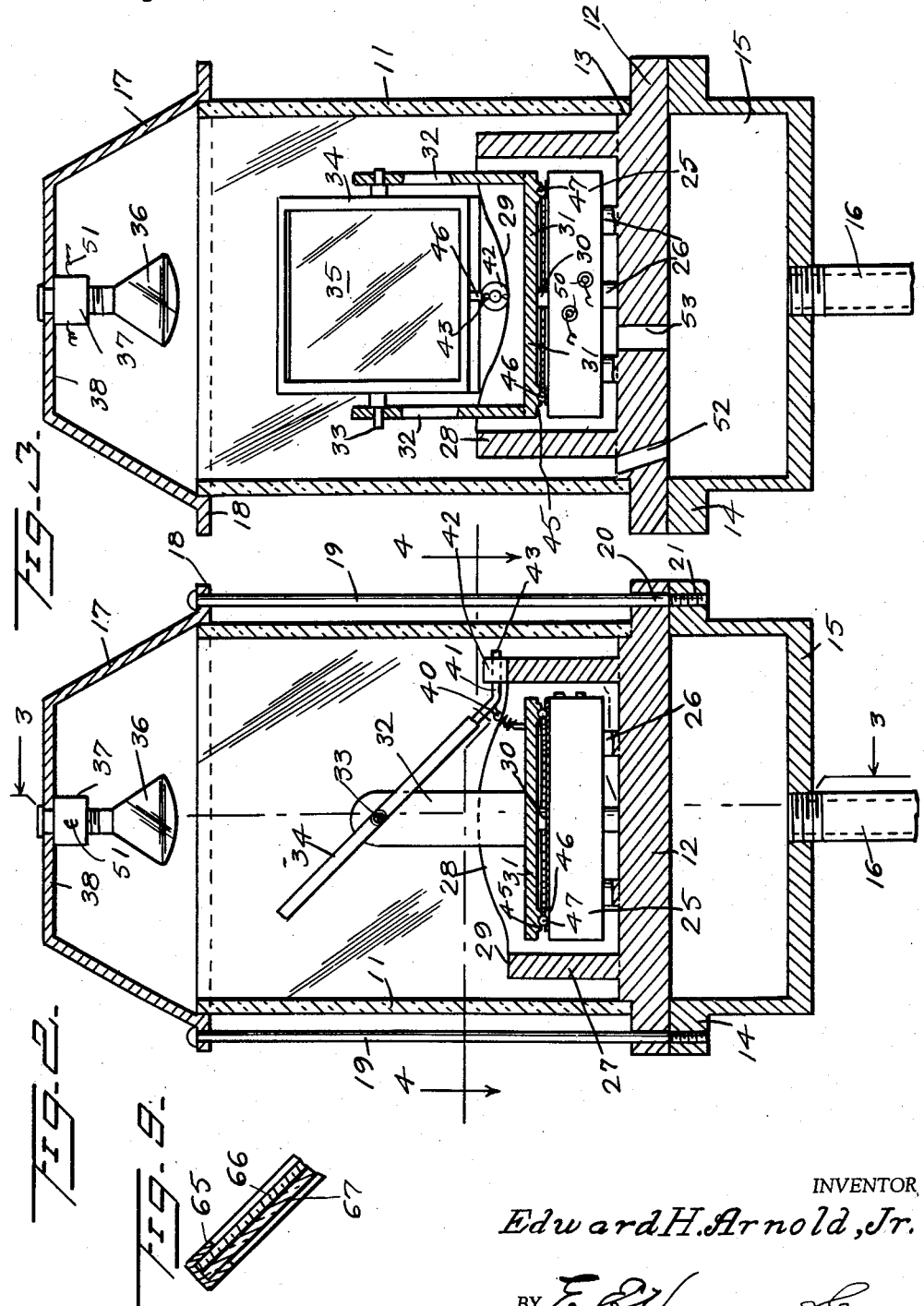

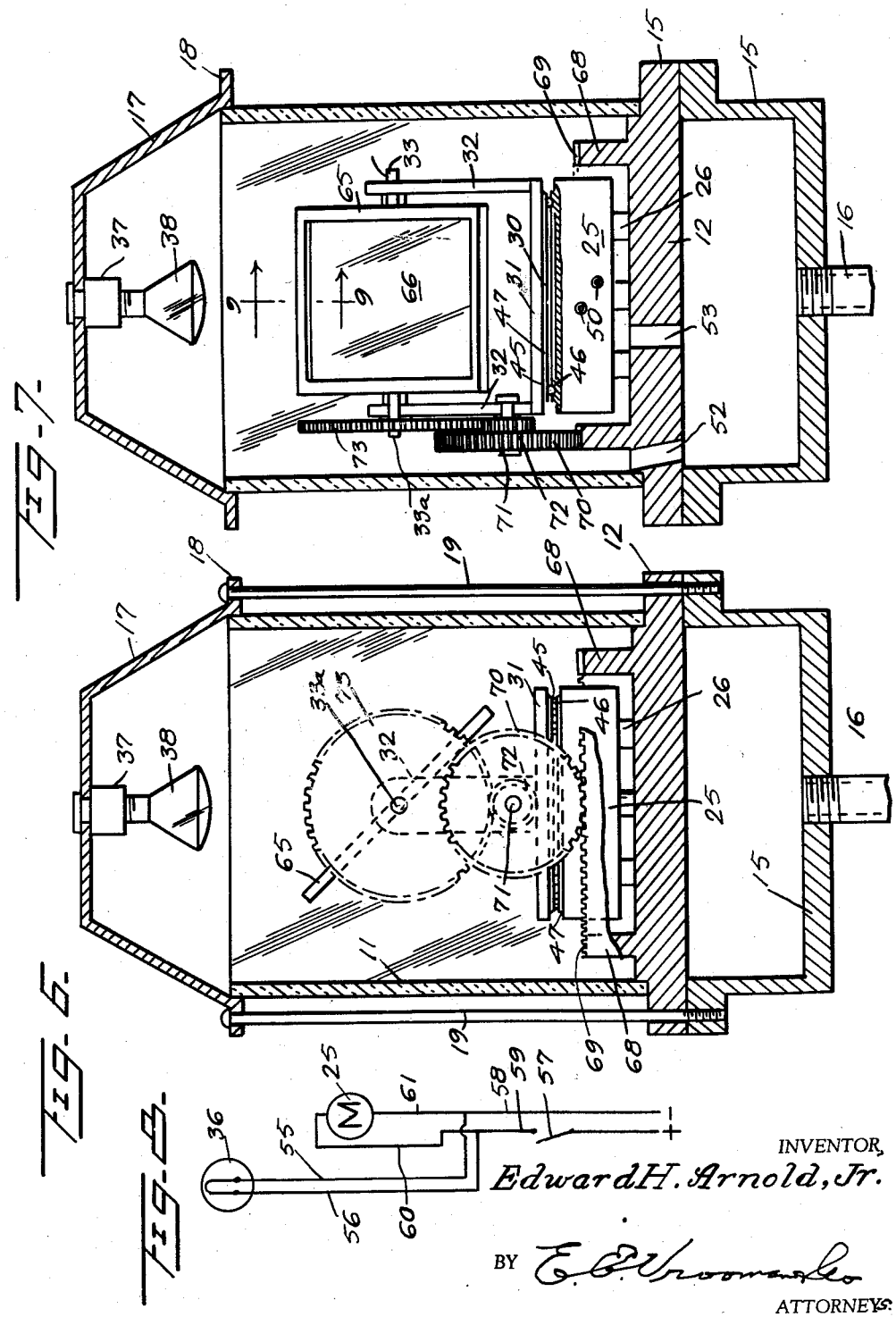

United States Patent Office 2,928,072
Patented Mar. 8, 1960

2,928,072

SIGNAL LIGHTS

Edward H. Arnold, Jr., New Orleans, La.

Application August 18, 1958, Serial No. 755,724

7 Claims. (Cl. 340—50)

This invention relates to a signal light or beacon, and has as its primary object the provision of an improved signal light which combines rotary movement of a beam with oscillatory movement thereof for signalling or warning purposes.

An additional object of the invention is the provision of such a signal light which incorporates a housing containing a source of illumination, and a rotary mirror with means for oscillating the mirror about a pivot point coincident with the rotation thereof.

An additional important object of the invention is the provision of a signal light of this character which, through its combined rotary and oscillatory movement, will serve to attract attention, and be visible over a wide radius.

A more specific object of the invention is the provision of a device of this character provided with a mirror which is completely rotatable about a central pivot point, the mirror being differently colored on opposite sides, to provide a vari-colored beam.

A still further object of the invention is the provision of such a signal light which will be sturdy and durable in construction, reliable and efficient in operation, and relatively simple and inexpensive to manufacture, assemble and utilize.

Still other objects reside in the combinations of elements, arrangements of parts, and features of construction, all as will be more fully pointed out hereinafter and disclosed in the accompanying drawings, wherein there are shown preferred embodiments of this inventive concept.

In the drawing:

Figure 1 is a side elevational view of one form of signal light or beacon embodying features of the instant invention.

Fig. 2 is an enlarged sectional view taken substantially along the line 2—2 of Figure 1 as viewed in the direction indicated by the arrows.

Fig. 3 is a sectional view taken substantially along the line 3—3 of Fig. 2 as viewed in the direction indicated by the arrows.

Fig. 4 is a sectional view taken substantially along the line 4—4 of Fig. 2 as viewed in the direction indicated by the arrows.

Fig. 5 is an enlarged side elevational view of a constructional detail.

Fig. 6 is a view similar to Fig. 2, but showing a modified form of construction.

Fig. 7 is a sectional view taken substantially along the line 7—7 of Fig. 6 as viewed in the direction indicated by the arrows.

Fig. 8 is a schematic wiring diagram of the signal light and its associated mechanism, and Fig. 9 is a fragmentary enlarged sectional view taken substantially along the line 9—9 of Fig. 7 as viewed in the direction indicated by the arrows.

Similar reference characters refer to similar parts throughout the several views of the drawing.

Having reference now to the drawing in detail, and more particularly to Figure 1, there is generally indicated at 10 a signal light, which may be of any desired configuration, but which, in the illustrative embodiment shown, comprises a cylindrical or translucent lens portion which may be clear or colored, or multi-colored on different faces and, which is mounted on a base 12. The base 12 has an inner flange or rim 13 against which the lower portion of the lens 11 seats, and is, in turn, supported on a flange 14 forming a part of a hollow housing 15. The housing 15 is, in turn, supported on a standard 16, which may be of any desired height and thickness, as desired.

A cap portion 17 is also provided, and has peripheral flange 18. The lens 11 is secured in position in any desired manner as, for example, by means of elongated bolts 19 which extend through suitable apertures in the flange 18, and corresponding aligned apertures 20 and 21 in the flange members 12 and 14 respectively. The apertures 20 may be threaded, if desired, to receive the ends of bolts 19, or suitable nuts may be secured to the ends of bolts 19 in the event that the latter are extended beyond the flange 14.

An electric motor 25 is mounted on the base 12 on suitable mounting blocks 26 interiorly of the lens structure 11, and is surrounded by an annulus 27, which has alternately spaced high and low surfaces 28 and 29 respectively, forming a cam ring.

The motor 25 is provided with a drive shaft 30, upon which is rotatably mounted a disc 31, from the opposite sides of which extend uprights 32, which are apertured at their upper ends to provide journals for an axle 33, which is fixedly secured to a suitable mirror frame 34, the latter being, in the illustrative embodiment shown, of rectangular configuration. A mirror 35 is positioned in the frame 34, and is inclined upwardly so that the beam from a source of light, such as the light bulb 36, carried in the suitable socket 37 secured to the top 38 of the cap 17, is continuously directed thereon.

An arm 40 extends from the lower portion of the frame 32, and includes a horizontal offset portion 41 which carries a roller 42, the latter being held in position as by means of a cotter pin 43, and serving as a cam follower rotating along the cam surface formed by the high and low portions 28 and 29 of ring 27.

Suitable upper and lower bearing races 45 and 46 are provided on the lower side of disc 31, and the upper side of motor housing 25, respectively, and carry suitable ball or roller bearings 47, to insure free rotation of the disc 31 and its associated pivoted mirror when driven by the motor shaft 30.

Suitable terminals 50 are provided for the motor 25, as are additional terminals, 51 for the light socket 37. The tubular standard 16 is hollow, and suitable passages 52 and 53 are provided through the base plate 12 for the passage of wires to the motor and the light socket. These wires are omitted for clarity of illustration, in Figs. 2 and 3, but Fig. 8 discloses a wiring diagram, wherein the light 36 is disclosed as connected by means of wires 55 and 56 to positive and negative input lines 57 and 58, respectively, the positive line being provided with a suitable manual switch 59, for the energization of the light source and the motor 25. Suitable lines 60 and 61 lead to the motor from any suitable source of electrical power. It is pointed out that the tubular standard 16 is preferably hollow to provide passage for the wires.

A modified form of construction is disclosed in Figs. 6 and 7, wherein the standard 16, the hollow base 15, with the flanged plate 12, the cap 17 with its flange 18, and the connecting bolts 19, as well as the tubular or cylindrical lens 11 are substantially identical to those disclosed in the preceding modification. The cap 17 is provided with a light socket 37 and a light 38, all substantially identical to that of the foregoing modification. Suitable passages 52 and 53 are also provided for plate 12 for the passage of wires from the standard 16.

A motor 25 is mounted on supports 26, and provided with terminals 50 for wiring as in the preceding modification, there also being a circular disc or table 31 driven from the drive shaft of the motor 30, and mounted on bearings 47 in upper and lower bearing races 45 and 46 respectively. The table 31 also carries a pair of spaced-apart uprights 32, in suitable bearings in the upper ends of which are journalled the ends of an axle 33, which supports a mirror frame 65. The mirror frame 65 is similar to that in the previously described modification, but carries a double mirror, the components of which may be either differently colored or plain silver, as best seen in Fig. 9, wherein the opposite side faces 66 and 67 are colored red and green, respectively. In this modification the cam ring 27 is supplanted by a crown gear 68, having teeth 69 on its upper rim which are adapted to mesh with a gear 70, which is mounted on a stub axle 71, which is carried by one of the uprights 32. The axle 71 also carries a smaller gear 72, which meshes, in turn, with a relatively large gear 73 carried by one end 33a of the axle 33. The arrangement is thus such that as the table in this modification is rotated, the gear 70 is driven by the crown gear teeth 69, and through gears 72 and 73, rotates the mirror frame 65 so that the same completely reverses itself about the axis formed by the axle 33.

The wiring for this modification is identical to that previously discussed and shown in Fig. 8.

Thus it will be seen that with the modified form of construction disclosed in Figs. 1 to 5 inclusive, there is provided a constant rotating light beam reflected from the light source 36 onto the mirror 35, which is continuously oscillated in an up and down movement as the light beam rotates, thus providing a rotating and oscillating beam.

In the modification disclosed in Figs. 6 and 7, there is a continuously oscillating beam, which oscillates with a greater angularity, and which is so arranged as to alternate in color according to the surface, 66 or 67, of the mirror which is disposed toward the light beam. The ratio of the gear teeth may be such that a different color and a different angle may be provided during each rotation of the table 31, and its associated mirror supports, to provide a wide variety of lighting effects.

From the foregoing it will now be seen that there is herein provided an improved signal light or rotating and oscillating beacon, which accomplishes all of the objects of this invention, and others, including many advantages of great practical utility.

As many embodiments may be made of this inventive concept and as many modifications may be made in the embodiments hereinbefore shown and described, it is to be understood that all matter herein is to be interpreted merely as illustrative and not in a limiting sense.

What is claimed is:

1. In a signal light, the combination of a housing comprised of a base, a cylindrical transparent lens mounted on said base, and an opaque cap carried on said lens, a source of light in said cap, a rotatable disc in said housing, uprights carried on said disc, an axle extending transversely between said uprights, a mirror pivotally supported on said axle, means for continuously rotating said disc and hence said mirror, and means operable by the rotation of said disc for simultaneously continuously oscillating said mirror about said axle simultaneously with the rotation thereof.

2. In a signal light, the combination of a housing comprised of a base, a cylindrical transparent lens mounted on said base, and an opaque cap carried on said lens, a source of light in said cap, a rotatable disc in said housing, uprights carried on said disc, an axle extending transversely between said uprights, a mirror pivotally supported on said axle, means for continuously rotating said disc and hence said mirror, means operable by the rotation of said disc for simultaneously continuously oscillating said mirror about said axle simultaneously with the rotation thereof, said last-mentioned means including a cam surfaced ring surrounding said disc and a cam follower carried by said mirror.

3. The structure of claim 1 wherein said means for rotating said disc includes an electric motor contained in said housing.

4. The structure of claim 3 wherein said motor is provided with a flat top surface on which said disc is supported, and bearings are provided between said top and said disc.

5. In a signal light, the combination of a housing comprised of a base, a cylindrical transparent lens mounted on said base, and an opaque cap carried on said lens, a source of light in said cap, a rotatable disc in said housing, uprights carried on said disc, an axle extending transversely between said uprights, a mirror pivotally supported on said axle, means for continuously rotating said disc and hence said mirror, and means operable by the rotation of said disc for simultaneously continuously oscillating said mirror about said axle simultaneously with the rotation thereof, said last-mentioned means comprising a gear train including a crown gear surrounding said disc, and a rotatable gear mounted on said axle driven by rotation of said disc.

6. The structure of claim 1 wherein said means for rotating said disc includes an electric motor contained in said housing, said means for oscillating said mirror comprising a gear train including a crown gear surrounding said disc, and a rotatable gear mounted on said axle driven by rotation of said disc.

7. The structure of claim 6 wherein said mirror is double-sided and completely rotatable about said axle, the opposite sides of said mirror being of different colors.

References Cited in the file of this patent

UNITED STATES PATENTS

| 1,238,220 | Thurber | Aug. 28, 1917 |
| 1,417,457 | Cook | May 23, 1922 |
| 1,759,368 | Piron | May 20, 1930 |
| 2,003,022 | Thompson | May 28, 1935 |
| 2,118,709 | Lebby | May 24, 1938 |
| 2,748,371 | Wilcox | May 29, 1956 |
| 2,846,663 | Heeler et al. | Aug. 5, 1958 |